(12) United States Patent
Agranat et al.

(10) Patent No.: US 6,456,308 B1
(45) Date of Patent: Sep. 24, 2002

(54) EMBEDDED WEB SERVER

(75) Inventors: Ian D. Agranat, Weston; Kenneth A. Giusti, Upton; Scott D. Lawrence, Concord, all of MA (US)

(73) Assignee: Agranat Systems, Inc., Maynard, MA (US)

( * ) Notice: Subject to any disclaimer, the term of this patent is extended or adjusted under 35 U.S.C. 154(b) by 0 days.

(21) Appl. No.: 09/715,749

(22) Filed: Nov. 17, 2000

Related U.S. Application Data

(63) Continuation of application No. 09/322,382, filed on May 28, 1999, now abandoned, which is a continuation of application No. 08/907,770, filed on Aug. 8, 1997, now Pat. No. 5,973,696.
(60) Provisional application No. 60/108,321, filed on Nov. 13, 1998, and provisional application No. 60/023,373, filed on Aug. 8, 1996.

(51) Int. Cl.[7] .............................. G06F 3/00; G06F 15/16
(52) U.S. Cl. ....................... 345/854; 709/201; 709/203; 707/501.1; 707/513
(58) Field of Search ................................. 345/854, 764; 395/500; 707/501.1, 513, 514, 515, 901; 709/201, 203, 501, 513

(56) References Cited

U.S. PATENT DOCUMENTS

| | | | |
|---|---|---|---|
| 4,319,338 A | 3/1982 | Grudowski et al. | |
| 4,937,777 A | 6/1990 | Flood et al. | |
| 4,953,074 A | 8/1990 | Kametani et al. | |
| 5,012,402 A | 4/1991 | Akiyama | |
| 5,072,412 A | 12/1991 | Henderson, Jr. et al. | |
| 5,122,948 A | 6/1992 | Zapolin | |
| 5,157,595 A | 10/1992 | Lovrenich | |
| 5,225,974 A | 7/1993 | Mathews et al. | |
| 5,297,257 A | 3/1994 | Struger et al. | |
| 5,307,463 A | 4/1994 | Hyatt et al. | |
| 5,321,829 A | 6/1994 | Zifferer | |
| 5,398,336 A | 3/1995 | Tantry et al. | |
| 5,406,473 A | 4/1995 | Yoshikura et al. | |
| 5,420,977 A | 5/1995 | Sztipanovits et al. | |
| 5,530,852 A | * 6/1996 | Meske, Jr et al. | 709/206 |
| 5,572,643 A | * 11/1996 | Judson | 709/218 |
| 5,598,536 A | 1/1997 | Slaughter, III et al. | |
| 5,613,115 A | 3/1997 | Gihl et al. | |
| 5,623,652 A | 4/1997 | Vora et al. | |
| 5,625,781 A | 4/1997 | Cline et al. | |
| 5,706,502 A | * 1/1998 | Foley et al. | 395/610 |
| 5,745,908 A | * 4/1998 | Anderson et al. | 707/513 |
| 5,768,593 A | * 6/1998 | Walter et al. | 395/705 |
| 5,805,442 A | 9/1998 | Crater et al. | |

OTHER PUBLICATIONS

Allaire Releases Cold Fusion 1.5, Minneapolis, MN, Feb. 6, 1996, p. 30, Press Release posted at http://www.allaire.com.
"Allaire Announces Cold Fusion™ Fuel Pack Program", San Jose, Ca, Apr. 30, 1996, Press Release posted at http://www.allaire.com, pp. 1–2.
"Allaire Introduces Major New Release of Cold Fusion Web Application Development Tool", Cambridge, MA, Nov. 12, 1996, Press Release posted at http://www.allaire.com, pp. 1–14.
Allegro Software Development, "RomPager Embedded Web Server Toolkit Architecture", 1996, article posted at http://www.allegrosoft.com, pp. 1–2.

(List continued on next page.)

Primary Examiner—Raymond J. Bayerl
Assistant Examiner—Cuong T. Thai
(74) Attorney, Agent, or Firm—Wolf, Greenfield & Sacks, P.C.

(57) ABSTRACT

An embedded graphical user interface employs a World-Wide-Web communications and display paradigm. The development environment includes an HTML compiler which recognizes and processes a number of unique extensions to HTML. The HTML compiler produces an output which is in the source code language of an application to which the graphical user interface applies. A corresponding run-time environment includes a server which serves the compiled HTML documents to a browser.

13 Claims, 16 Drawing Sheets

OTHER PUBLICATIONS

Allegro Software Development, "RomPager Embedded Web Server Toolkit Features", 1996, article posted at http://www.allegrosoft.com, pp. 1–2.

Allaire, Products Overview, 1997, Press Release posted at http://www.allaire.com, pp. 1–5.

Michael R. Genesereth and Anna Patterson, editors, "The Sixth International World Wide Web Conference Proceedings", Apr. 7–11, 1997, Santa Clara, CA.

Crespo, Arthro and Eric A. Bier, "WebWriter: A browser –based editor for constructing Web applications," Computer Networks and ISDN Systems, vol. 28, No. 11, May 1996, pp. 1291–1306.

Ladd, David, A. and J. Christopher Ramming, "Programming the Web: An Application–Oriented Language for Hypermedia Service Programming," Proceedings of the 4th International World Wide Web Conference, Dec. 1995, Boston, MA, XP 0020498 (http://www.w3.org/pub/Conference/WWW4/Papers/251/).

* cited by examiner

```
NetFax State: <b><EMWEB_STRING C='
static const char *StateName[]
={ "Sending"
, "Receiving"
, "Idle"
};

return StateName [ GlobalFaxState ];
'>
<EMWEB_PROTO>Sending</EMWEB_PROTO>
</b>
```

Fig. 3

```
Number of pages sent: <b>   ← 401
<EMWEB_STRING EMWEB_TYPE=DECIMAL_INT C='
  return &GlobalNumPages;
'>
<EMWEB_PROTO>12</EMWEB_PROTO>
</b>
```

Fig. 4

```
<EMWEB_INCLUDE C='
if ( FeatureTable[ fooFeature ].installed )
{
    return "/help/foo.html";
}
else
{
    return NULL;
}
'>
```

Fig. 6

```
<H2>Paper Tray Status:</H2>
<ol>
<EMWEB_STRING EMWEB_ITERATE C='
    int tray_percent_full. tray;

tray = ewsContextIterations( ewsContext );
    if ( tray >= NumberOfTrays )
         return NULL; /* terminate iterations */
    tray_percent_full = PaperSupply( tray );
    if ( tray_percent_full == 0 )
         strcpy( buffer, "<li><b>Empty</b>" );
    else
         sprintf( buffer, "<li>%d%% full", tray_percent_full );
    return buffer;
'>
</ol>
```

Fig. 7

```
<EMWEB_INCLUDE EMWEB_ITERATE C='
int feature = ewsContextIterations( ewsContext );
if (feature < FEATURE_TABLE_SIZE )
{
    if ( FeatureTable[ feature ].installed )
        return FeatureTable[ feature ].url;
    else
        return ""; /* no content, but continue iteration */
}
else
    return NULL; /* no content and stop iteration */
'>
```

Fig. 8

EMBEDDED WEB SERVER

CROSS-REFERENCE TO RELATED APPLICATION

Priority is claimed under 35 U.S.C. §119(e) to the inventors' Provisional U.S. Patent Application Ser. No. 60/023,373, entitled EXTENDED LANGUAGE COMPILER AND RUN TIME SERVER, filed Aug. 8, 1996, now abandoned, and to the inventors' Provisional U.S. Patent Application Ser. No. 60/108,321, entitled EMBEDDED GRAPHICAL USER INTERFACE USING A PROGRAMMING LANGUAGE, filed Nov. 13, 1998, now abandoned. The inventors' above-identified provisional U.S. patent applications are incorporated herein by reference.

This application is a continuation of application Ser. No. 09/322,382, filed May 28, 1999, entitled EMBEDDED WEB SERVER, and now abandoned, which is a continuation of application Ser. No. 08/907,770, filed Aug. 8, 1997, entitled EMBEDDED WEB SERVER, issued on Oct. 26, 1999 as U.S. Pat. No. 5,973,696.

COPYRIGHT NOTICE

The appendices attached to the disclosure of this patent contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The present invention relates generally to graphical user interfaces (GUIs), i.e. user interfaces in which information can be presented in both textual form and graphical form. More particularly, the invention relates to GUIs used to control, manage, configure, monitor and diagnose software and hardware applications, devices and equipment using a World-Wide-Web client/server communications model. Yet more particularly, the invention relates to methods and apparatus for developing and using such GUIs based on a World-Wide-Web client/server communications model.

2. Related Art

Many modern communications, entertainment and other electronic devices require or could benefit from improved local or remote control, management, configuration, monitoring and diagnosing. It is common for such devices to be controlled by a software application program specifically written for each device. The design of such a device includes any hardware and operating environment software needed to support the application, which is then referred to as an embedded application, because it is embedded within the device. Embedded application programs are generally written in a high-level programming language such as C, C++, etc., referred to herein as a native application programming language. Other languages suitable to particular uses may also be employed. The application program communicates with users through a user interface, generally written in the same high-level language as the application.

The representation of an application in a native application programming language is referred to as the application program source code. A corresponding representation, which can be executed on a processor, is referred to as an executable image.

Before an application written in a high-level language can be executed it must be compiled and linked to transform the application source code into an executable image. A compiler receives as an input a file containing the application source code and produces as an output a file in a format referred to as object code. Finally, one or more object code files are linked to form the executable image. Linking resolves references an object module may make outside of that object module, such as addresses, symbols or functions defined elsewhere.

Source code may also define arrangements by which data can be stored in memory and conveniently referred to symbolically. Such defined arrangements are referred to as data structures because they represent the physical arrangement of data within memory, i.e., the structure into which the data is organized.

Most commonly, remote control, management, configuration, monitoring and diagnosing applications employ unique proprietary user interfaces integrated with the application software and embedded into the device. Frequently these user interfaces present and receive information in text form only. Moreover, they are not portable, generally being designed to operate on a specific platform, i.e., combination of hardware and software. The devices for which control, management, configuration and diagnosing are desired have only limited run-time resources available, such as memory and long-term storage space. Proprietary interfaces are frequently designed with such limitations to data presentation, data acquisition and portability because of the development costs incurred in providing such features and in order to keep the size and run-time resource requirements of the user interface to a minimum. Since each user interface tends to be unique to the particular remote control, management, configuration, monitoring or diagnosing function desired, as well as unique to the operating system, application and hardware platform upon which these operations are performed, significant time and/or other resources may be expended in development. Graphics handling and portability have therefore been considered luxuries too expensive for most applications.

However, as the range of products available requiring control, management, configuration, monitoring or diagnosing increase, such former luxuries as graphical presentation and portability of the interface from platform to platform have migrated from the category of luxuries to that of necessities. It is well known that information presented graphically is more quickly and easily assimilated than the same information presented as text. It is also well known that a consistent user interface presented by a variety of platforms is more likely to be understood and properly used than unique proprietary user interfaces presented by each individual platform. Therefore, portable GUIs with low ran-time resource requirements are highly desirable.

With the growing popularity and expansion of the Internet, one extremely popular public network for communications between computer systems, and development of the World-Wide-Web communication and presentation model, a new paradigm for communication of information has emerged.

The World-Wide-Web and similar private architectures such as internal corporate LANs, provide a "web" of interconnected document objects. On the World-Wide-Web, these document objects are located on various sites on the global Internet. The World-Wide-Web is also described in "The World-Wide Web," by T. Berners-Lee, R. Cailliau, A. Luotonen, H. F. Nielsen, and A. Secret, *Communications of the ACM*, 37 (8), pp. 76–82, August 1994, and in "World Wide Web: The Information Universe," by Berners-Lee, T., et al., in *Electronic Networking: Research, Applications and*

*Policy,* Vol. 1, No. 2, Meckler, Westport, Conn., Spring 1992. On the Internet, the World-Wide-Web is a collection of documents (i.e., content), client software (i.e., browsers) and server software (i.e., servers) which cooperate to present and receive information from users. The World-Wide-Web is also used to connect users through the content to a variety of databases and services from which information may be obtained. However, except as explained below, the World-Wide-Web is based principally on static information contained in the content documents available to the browsers through the servers. Such a limitation would make the World-Wide-Web paradigm useless as a GUI, which must present dynamic information generated by a device or application.

The World-Wide-Web communications paradigm is based on a conventional client-server model. Content is held in documents accessible to servers. Clients can request, through an interconnect system, documents which are then served to the clients through the interconnect system. The client software is responsible for interpreting the contents of the document served, if necessary.

Among the types of document objects in a "web" are documents and scripts. Documents in the World-Wide-Web may contain text, images, video, sound or other information sought to be presented, in undetermined formats known to browsers or extensions used with browsers. The presentation obtained or other actions performed when a browser requests a document from a server is usually determined by text contained in a document which is written in Hypertext Mark-up Language (HTML). HTML is described in *Hyper-Text Markup Language Specification*—2.0, by T. Berners-Lee and D. Connolly, RFC 1866, proposed standard, November 1995, and in "World Wide Web & HTML," by Douglas C. McArthur, in *Dr. Dobbs Journal,* December 1994, pp. 18–20, 22, 24, 26 and 86. HTML documents stored as such are generally static, that is, the contents do not change over time except when the document is manually modified. Scripts are programs that can generate HTML documents when executed.

HTML is one of a family of computer languages referred to as mark-up languages. Mark-up languages are computer languages, which describe how to display, print, etc. a text document in a device-independent way. The description takes the form of textual tags indicating a format to be applied or other action to be taken relative to document text. The tags are usually unique character strings having defined meanings in the mark-up language. Tags are described in greater detail, below.

HTML is used in the World-Wide-Web because it is designed for writing hypertext documents. The formal definition is that HTML documents are Standard Generalized Markup Language (SGML) documents that conform to a particular Document Type Definition (DTD). An HTML document includes a hierarchical set of markup elements, where most elements have a start tag, followed by content, followed by an end tag. The content is a combination of text and nested markup elements. Tags are enclosed in angle brackets ('<' and '>') and indicate how the document is structured and how to display the document, as well as destinations and labels for hypertext links. There are tags for markup elements such as titles, headers, text attributes such as bold and italic, lists, paragraph boundaries, links to other documents or other parts of the same document, in-line graphic images, and many other features.

For example, here are several lines of HTML:
Some words are <B>bold</B>, others are <I>italic</I>.
Here we start a new paragraph.<P>Here's a link to the <A HREF="http://www.agranat.com">Agranat Systems, Inc.</A>home page.

This sample document is a hypertext document because it contains a "link" to another document, as provided by the "HREF=." The format of this link will be described below. A hypertext document may also have a link to other parts of the same document. Linked documents may generally be located anywhere on the Internet. When a user is viewing the document using a client program called a Web browser (described below), the links are displayed as highlighted words or phrases. For example, using a Web browser, the sample document above would be displayed on the user's screen as follows:

Some words are bold, others are italic. Here we start a new paragraph.

Here's a link to Agranat Systems, Inc. home page.

In the Web browser, the link may be selected, for example by clicking on the highlighted area with a mouse. Selecting a link will cause the associated document to be displayed. Thus, clicking on the highlighted text "Agranat Systems, Inc." would display that home page.

Although a browser can be used to directly request images, video, sound, etc. from a server, more usually an HTML document which controls the presentation of information served to the browser by the server is requested. However, except as noted below, the contents of an HTML file are static, i.e., the browser can only present a passive snapshot of the contents at the time the document is served. In order to present dynamic information, i.e., generated by an application or device, or obtain from the user data which has been inserted into an HTML-generated form, conventional World-Wide-Web servers use a "raw" interface, such as the common gateway interface (CGI), explained below. HTML provides no mechanism for presenting dynamic information generated by an application or device, except through a raw interface, such as the CGI. Regarding obtaining data from the user for use by the application or device, although standard HTML provides a set of tags which implement a convenient mechanism for serving interactive forms to the browser, complete with text fields, check boxes and pull-down menus, the CGI must be used to process submitted forms. Form processing is important to remote control, management, configuration, monitoring and diagnosing applications because forms processing are a convenient way to configure an application according to user input using the World-Wide-Web communications model. But, form processing using a CGI is extremely complex, as will be seen below, requiring an application designer to learn and implement an unfamiliar interface. A CGI is therefore not a suitable interface for rapid development and prototyping of new GUI capabilities. Moreover, a developer must then master a native application source code language (e.g., C, C++, etc.), HTML and the CGI, in order to develop a complete application along with its user interface.

Models of the World-Wide-Web communications paradigm for static content and dynamic content are shown in FIGS. 14 and 15, respectively. As shown in FIG. 14, a browser 1401 makes a connection 1402 with a server 1403, which serves static content 1405 from a storage device 1407 to the browser 1401. In the case of dynamic content, shown in FIG. 15, the server 1403 passes control of the connection 1402 with the browser 1401 to an application 1501, through the CGI 1503. The application 1501 must maintain the connection 1402 with the browser 1401 and must pass control back to the server 1403 when service of the request, which included dynamic content, is complete. Furthermore, during service of a request which includes dynamic content, the application 1501 is responsible for functions normally performed by the server 1403, including maintaining the connection 1402 with the browser 1401, generating headers in the server/browser transport protocol, generating all of the static and dynamic content elements, and parsing any form data returned by the user. Since use of the CGI 1503 or other raw interface forces the application designer to do all of this work, applications 1501 to which forms are submitted are necessarily complex.

In order to provide dynamic content to a browser, the World-Wide-Web has also evolved to include Java and other client side scripting languages, as well as some server side scripting languages. However, these languages are interpreted by an interpreter built into the browser 1401 or server 1403, slowing down the presentation of information so generated. In the case of client side scripting, the script does not have any direct access to the application or to application specific information. Therefore, in order to generate or receive application specific information using client side scripting, the CGI 1503 or other raw interface must still be used. In the case of server side scripting, the server 1403 must parse the content as it is served, looking for a script to be interpreted. The access, which a script has to the application, is limited by the definition of the scripting language, rather than by an application software interface designed by the application designer.

A server side script is an executable program, or a set of commands stored in a file, that can be run by a server program to produce an HTML document that is then returned to the Web browser. Typical script actions include running library routines or other applications to get information from a file, a database or a device, or initiating a request to get information from another machine, or retrieving a document corresponding to a selected hypertext link. A script may be run on the Web server when, for example, the end user selects a particular hypertext link in the Web browser, or submits an HTML form request. Scripts are usually written in an interpreted language such as Basic, Practical Extraction and Report Language (Perl) or Tool Control Language (Tcl) or one of the Unix operating system shell languages, but they also may be written in programming languages such as the "C" programming language and then compiled into an executable program. Programming in Tcl is described in more detail in *Tcl and the Tk Toolkit,* by John K. Ousterhout, Addison-Wesley, Reading, Mass., USA, 1994. Perl is described in more detail in *Programming Perl,* by Larry Wall and Randal L. Schwartz, O'Reilly & Associates, Inc., Sebastopol, Calif., USA, 1992.

Each document object in a web has an identifier called a Universal Resource Identifier (URI). These identifiers are described in more detail in T. Berners-Lee, "Universal Resource Identifiers in World-Wide-Web: A Unifying Syntax for the Expression of Names and Addresses of Objects on the Network as used in the World-Wide Web," RFC 1630, CERN, June 1994; and T. Berners-Lee, L. Masinter, and M. McCahill, "*Uniform Resource Locators* (URL)," RFC 1738, CERN, Xerox PARC, University of Minnesota, December 1994. A URI allows any object on the Internet to be referred to by name or address, such as in a link in an HTML document as shown above. There are two types of URIs: a Universal Resource Name (URN) and a Uniform Resource Locator (URL). A URN references an object by name within a given name space. The Internet community has not yet fully defined the syntax and usage of URNs. A URL references an object by defining an access algorithm using network protocols. An example URL is "http://www.agranat.com" A URL has the syntax "scheme: scheme_specific_components" where a "scheme" identifies the access protocol (such as HTTP, FTP or GOPHER).

For a scheme of HTTP, the URL may be of the form "http://host:port/path?search" where "host" is the Internet domain name of the machine that supports the protocol;

"port" is the transmission control protocol (TCP) port number of the appropriate server (if different from the default);

"path" is a scheme-specific identification of the object; and

"search" contains optional parameters for querying the content of the object.

URLs are also used by web servers and browsers on private computer systems or networks and not just the World-Wide-Web.

A site, i.e. an organization having a computer connected to a network, that wishes to make documents available to network users is called a "Web site" and must run a "Web server" program to provide access to the documents. A Web server program is a computer program that allows a computer on the network to make documents available to the rest of the World-Wide-Web or a private web. The documents are often hypertext documents in the HTML language, but may be other types of document objects as well, as well as images, audio and video information. The information that is managed by the Web server includes hypertext documents that are stored on the server or are dynamically generated by scripts on the Web server. Several Web server software packages exist, such as the Conseil Europeen pour la Recherche Nucleaire (CERN, the European Laboratory for Particle Physics) server or the National Center for Supercomputing Applications (NCSA) server. Web servers have been implemented for several different platforms, including the Sun Sparc 11 workstation running the Unix operating system, and personal computers with the Intel Pentium processor running the Microsoft® MS-DOS operating system and the Microsoft® Windows™ operating environment.

Web servers also have a standard interface for running external programs, called the Common Gateway Interface (CGI). CGI is described in more detail in *How To Set Up and Maintain A Web Site,* by Lincoln D. Stein, Addison-Wesley, August 1995. A gateway is a program that handles incoming information requests and returns the appropriate document or generates a document dynamically. For example, a gateway might receive queries, look up the answer in an SQL database, and translate the response into a page of HTML so that the server can send the result to the client. A gateway program may be written in a language such as "C" or in a scripting language such as Perl or Tcl or one of the Unix operating system shell languages. The CGI standard specifies how the script or application receives input and parameters, and specifies how any output should be formatted and returned to the server.

A user (typically using a machine other than the machine used by the Web server) that wishes to access documents available on the network at a Web site must run a client program called a "Web browser." The browser program allows the user to retrieve and display documents from Web servers. Some of the popular Web browser programs are: the Navigator browser from NetScape Communications Corp., of Mountain View, Calif.; the Mosaic browser from the National Center for Supercomputing Applications (NCSA); the WinWeb browser, from Microelectronics and Computer Technology Corp. of Austin, Tex.; and the Internet Explorer, from Microsoft Corporation of Redmond, Wash. Browsers exist for many platforms, including personal computers with the Intel Pentium processor running the Microsoft® MS-DOS operating system and the Microsoft® Windows™ environment, and Apple Macintosh personal computers.

The Web server and the Web browser communicate using the Hypertext Transfer Protocol (HTTP) message protocol and the underlying transmission control protocol/internet protocol (TCP/IP) data transport protocol of the Internet. HTTP is described in *Hypertext Transfer Protocol—HTTP/1.0*, by T. Berners-Lee, R. T. Fielding, H. Frystyk Nielsen, Internet Draft Document, Oct. 14, 1995, and is currently in the standardization process. At this writing, the latest version is found in RFC Z068, which is a draft definition of HTTP/1.1. In HTTP, the Web browser establishes a connection to a Web server and sends an HTTP request message to the server. In response to an HTTP request message, the Web server checks for authorization, performs any requested action and returns an HTTP response message containing an HTML document resulting from the requested action, or an error message. The returned HTML document may simply be a file stored on the Web server, or it may be created dynamically using a script called in response to the HTTP request message. For instance, to retrieve a document, a Web browser sends an HTTP request message to the indicated Web server, requesting a document by its URL. The Web server then retrieves the document and returns it in an HTTP response message to the Web browser. If the document has hypertext links, then the user may again select a link to request that a new document be retrieved and displayed. As another example, a user may fill in a form requesting a database search, the Web browser will send an HTTP request message to the Web server including the name of the database to be searched and the search parameters and the URL of the search script. The Web server calls a program or script, passing in the search parameters. The program examines the parameters and attempts to answer the query, perhaps by sending a query to a database interface. When the program receives the results of the query, it constructs an HTML document that is returned to the Web server, which then sends it to the Web browser in an HTTP response message.

Request messages in HTTP contain a "method name" indicating the type of action to be performed by the server, a URL indicating a target object (either document or script) on the Web server, and other control information. Response messages contain a status line, server information, and possible data content. The Multipurpose Internet Mail Extensions (MIME) are a standardized way for describing the content of messages that are passed over a network. HTTP request and response messages use MIME header lines to indicate the format of the message. MIME is described in more detail in MIME (Multipurpose Internet Mail Extensions): Mechanisms for Specifying and Describing the Format of Internet Message Bodies, Internet RFC 1341, June 1992.

The request methods defined in the HTTP/1.1 protocol include GET, POST, PUT, HEAD, DELETE, LINK, and UNLINK. PUT, DELETE, LINK and UNLINK are less commonly used. The request methods expected to be defined in the final version of the HTTP/1.1 protocol include GET, POST, PUT, HEAD, DELETE, OPTIONS and TRACE. DELETE, PUT, OPTIONS and TRACE are expected to be less commonly used. All of the methods are described in more detail in the HTTP/1.0 and HTTP/1.1 specifications cited above.

Finally, a device or application using conventional World-Wide-Web technology must have access to a server. Conventional servers are large software packages, which run on relatively large, resource-rich computer systems. These systems are resource-rich in terms of processing speed and power, long-term storage capacity, short-term storage capacity and operating system facilities. Conventional servers take advantage of these resources, for example, in how they store content source documents. For high-speed, convenient access to content, it is conventionally stored in a directory tree of bulky ASCII text files. Therefore, conventional World-Wide-Web technology cannot be used to implement a GUI in a relatively small, inexpensive, resource-poor device or application.

The combination of the Web server and Web browser communicating using an HTTP protocol over a computer network is referred to herein as the World-Wide-Web communications paradigm.

SUMMARY OF THE INVENTION

It is therefore an object of the present invention to provide an improved graphical user interface (GUI) for use in connection with remote control, management, configuration, monitoring and diagnosing functions embedded in applications, devices and equipment.

According to one aspect of the invention, there is provided a method for providing a graphical user interface having dynamic elements. The method begins by defining elements of the graphical user interface in at least one text document written in a mark-up language. Next, the method defines including at a location in the document a code tag containing a segment of application source code. The text document is then served to a client which interprets the mark-up language; and when the location is encountered, the client is served a sequence of characters derived from a result of executing a sequence of instructions represented by the segment of application source code. An embodiment of code tags illustrating their use is described in detail, later.

According to another aspect of the invention, there is another method for providing a graphical user interface having dynamic elements. This method also defines elements of the graphical user interface in at least one text document written in a mark-up language. Included in the document is a string identified by prototype tags. The text document is served to a prototyping client which interprets the mark-up language but does not recognize and does not display the prototype tag, but does display the string. An embodiment of prototype tags illustrating their use is described in detail, later.

According to yet another aspect of the invention, there is yet another method for providing a graphical user interface having dynamic elements. Elements of the graphical user interface are defined in at least one text document written in a mark-up language. Included at a location in the document is a code tag containing a segment of application source code. Also included in the document is a string identified by prototype tags. The text document is compiled into a content source, which is subsequently decompiled into a replica of the text document. The replica of the text document is served to a client which interprets the mark-up language; and when the location is encountered in the replica, the client is served a character stream generated by executing the segment of application source code.

Yet another aspect of the invention is a software product recorded on a medium. The software product includes a mark-up language compiler which can compile a mark-up language document into a data structure in a native application programming language, the compiler recognizing one or more code tags which designate included text as a segment of application source code to be saved in a file for compilation by a compiler of the native application programming language.

Another aspect of the invention is a method for providing a graphical user interface having displayed forms for entry of data. The steps of this method include defining elements of the graphical user interface in at least one text document written in a mark-up language; naming in the document a data item requested of a user and used by an application written in a native application programming language; and compiling the text document into a content source including a data structure definition in the native application programming language for the named data item.

Yet another aspect of the invention may be practiced in a computer-based apparatus for developing a graphical user interface for an application, the apparatus including an editor which can manipulate a document written in a mark-up language and a viewer which can display a document written in the mark-up language. The apparatus further includes a markup language compiler which recognizes a code tag containing a source code fragment in a native application source code language, the code tag not otherwise part of the mark-up language, the compiler producing as an output a representation in the native application source code language of the document, including a copy of the source code fragment.

In accordance with another aspect of the invention, there is a method for developing and prototyping graphic user interfaces for an application. The method includes accessing an HTML file, encapsulating portions of said HTML and entering source code therein, producing a source module from said HTML with encapsulated portions, producing source code for a server, and cross compiling and linking said application, said source code module and said server thereby producing executable object code.

The invention, according to another aspect thereof, may be a data structure fixed in a computer readable medium, the data structure for use in a computer system including a client and a server in communication with each other. The data structure includes crosscompiled, stored and linked, HTML files with encapsulated portions containing executable code associated with said application, server code, and application code, wherein said executable code is run when the HTML file is served thereby providing real time dynamic data associated with said application.

BRIEF DESCRIPTION OF THE DRAWINGS

In the drawings, in which like reference numerals denote like elements:

FIG. 3 is an HTML text fragment illustrating the use of an EMWEB_STRING tag;

FIG. 4 is another HTML text fragment illustrating another use of an EMWEB_STRING tag;

FIG. 6 is another HTML text fragment illustrating another use of an EMWEB_INCLUDE tag;

FIG. 7 is an HTML text fragment showing a use of the EMWEB_ITERATE attribute in connection with an EMWEB_STRING tag;

FIG. 8 is an HTML text fragment showing a use of the EMWEB_ITERATE attribute in connection with an EMWEB_INCLUDE tag;

DETAILED DESCRIPTION

The present invention will be better understood upon reading the following detailed description in connection with the figures to which it refers.

Embodiments of various aspects of the invention are now described. First, a development environment is described in which application development and graphical user interface development are closely linked, yet require a low level of complexity compared to conventional development of an application and GUI. Second, an operating environment is described in which the application, a server and GUI are tightly coupled, compact and flexible. In the described system a GUI having portability, low run-time resource requirements and using any of a wide variety of systems available to a user as a universal front end, i.e. the point of contact with the user is software with which the user is already familiar.

Development Environment

Figure 1:
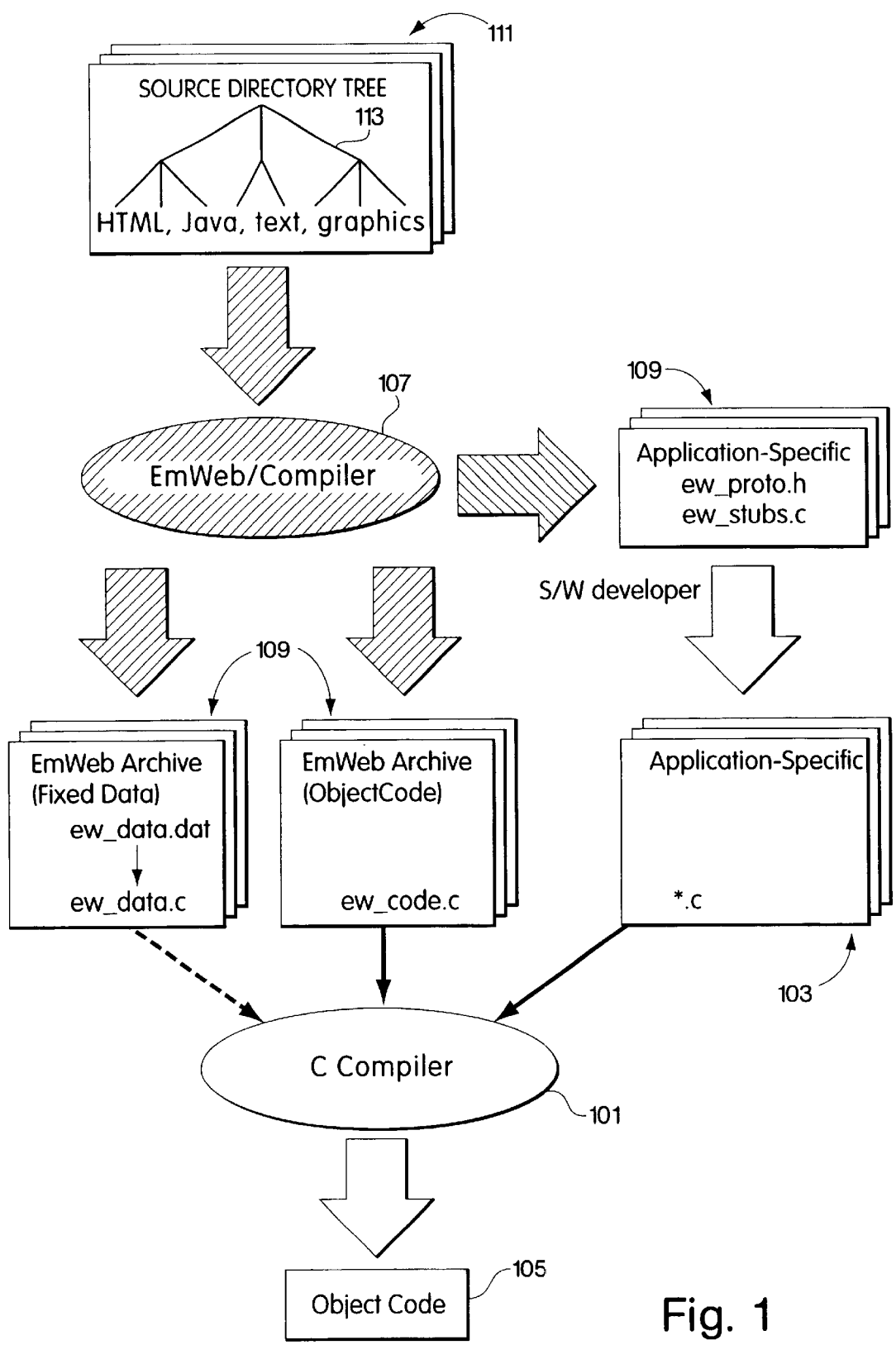
FIG. 1 is a block diagram of that aspect of the invention relating to development systems.

FIG. 1 illustrates a development environment according to one aspect of the invention. Not all components of the environment are shown, but those shown are identified in the following discussion.

Conventionally, an application development environment may include a source code editor, a compiler 101, a linker and a run-time environment in which to test and debug the application. It is expected that development environments in accordance with the invention include those components of a conventional development environment which a developer may find useful for developing an application. In the case of embedded applications, i.e., applications included within a device or larger application, the run-time environment includes the device or application in which the application is embedded, or a simulation or emulation thereof.

The compiler 101 takes source code 103 generated using the source code editor or from other sources and produces object code 105, which is later linked to form the executable image.

In addition to the conventional elements noted above, the described embodiment of a development environment according to the invention includes an HTML compiler 107 whose output 109 is in the source code language of the application under development. In addition, the development environment may include an HTML editor, an HTTP-compatible server for communicating with client software, i.e., browsers, and an HTTP-compatible browser.

The HTML editor is used to create and edit HTML documents 111 which define the look and feel of a GUI for the application. Numerous tools are now available for performing this task while requiring a minimal knowledge or no knowledge of HTML, for example, Microsoft® Front Page™. It is preferred that the HTML editor used permit entry of non-standard tags into the HTML document.

Figure 14:
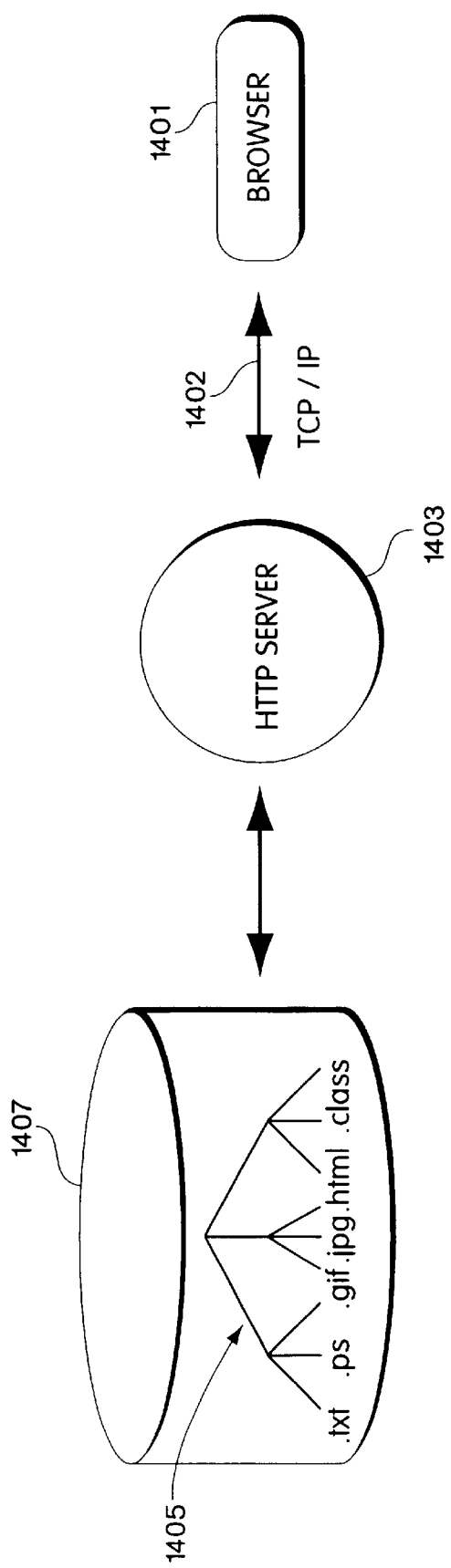
FIG. 14 is a block diagram illustrating conventional World-Wide-Web communication of static content between a server and a client.
Figure 15:
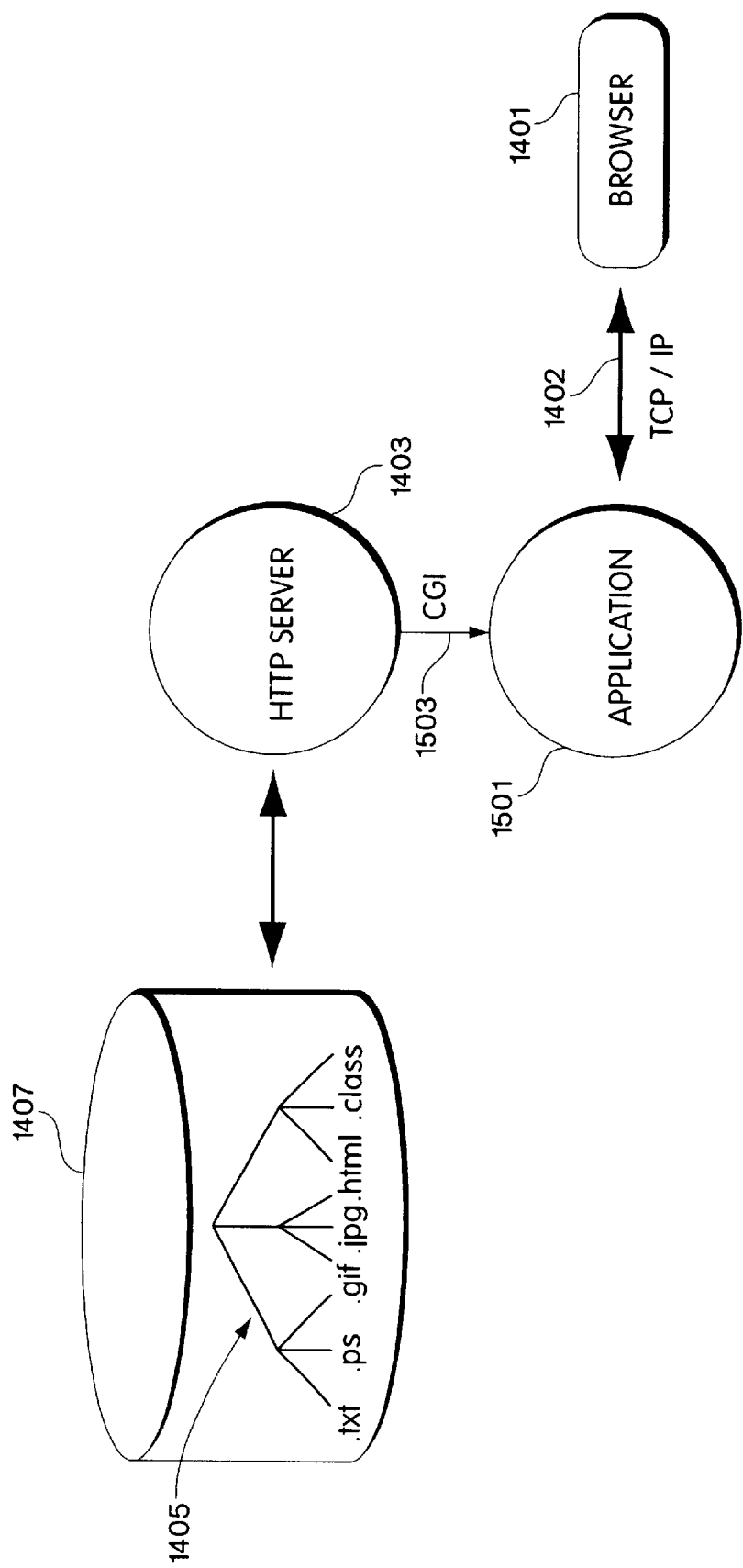
FIG. 15 is a block diagram illustrating conventional World-Wide-Web communication of dynamic content between a server and a client.

As will be seen in further detail, below, the server and browser are used to test a prototype GUI before it is fully integrated with the application or in the absence of the application. The browser should be capable of making a connection with the server using, for example, a conventional connection protocol such as TCP/IP, as shown and described above in connection with FIG. 14. Other protocols or direct connections can also be used, as would be understood by those skilled in this art. While the browser and the server may be connected through a network such as the Internet, they need not be. For example, the server and client may run and connect on a single computer system.

Application development proceeds substantially in a conventional manner as known to software developers. The application development should include the design of a software interface through which data will be communicated into and out of the application. However, the software interface is not a GUI. Rather, the interface merely defines how other software can communicate with the application. For example, the interface may be a collection of function calls and global symbols which other software can use to communicate with the application. The application should be written in a high level language such as C, C++, etc. The application can be tested by compiling and linking it with prototype code that provides or receives information through the software interface, exercising those features of the application.

Meanwhile, a GUI for the application is designed as follows. The look and feel of the GUI are developed using the HTML editor, server and browser to create a set of content source documents 111 including at least one HTML document, which together define the look and feel of the GUI. This aspect of GUI development is conventional, proceeding as though the developer was developing a World-Wide-Web site.

At locations in one or more HTML documents where data obtained from the application is to be displayed, the author includes special tags, explained further below, which allow the HTML document to obtain from the application the required data, using the application software interface.

The content source documents 111 are stored conventionally in the form of one or more directory trees 113. The directory tree 113 containing the content which defines the GUI is then compiled using the HTML compiler 107, to produce an application source code language output 109 representing the content source documents in the directory tree. The source code elements 109 produced from the content source documents 111 in the directory tree 113, source code for an HTTP compatible server (not shown) and the application source code 103 are compiled into object code 105 and linked to form an executable image. The server may be supplied in the form of an object code library, ready for linking into the finished executable image. The executable image thus formed fully integrates the graphical user interface defined using familiar tools of World-Wide-Web content development with the control and other functions defined using conventional application development tools.

In order to successfully perform the integration described above, the HTML compiler 107 of the described embodiment of the invention, the EmWeb™/compiler 107, recognizes a number of special extensions to HTML. The HTML extensions implemented by the EmWeb™/compiler 107, embodying aspects of the invention is described in detail in Appendix A, Section 3.2. Several of these extensions are described briefly here, to aid in understanding the invention.

The EMWEB_STRING tag is an extension of HTML used to encapsulate a fragment of source code in the HTML document. The source code will be executed by a system in which the application is embedded when the document is served to a browser (usually running on another system) and the location of the EMWEB_STRING tag is reached. The source code returns a character string that is inserted as is into the document at the location of the EMWEB_STRING tag. Examples of the use of the EMWEB_STRING tag are shown in FIGS. 3 and 4.

In the example of FIG. 3, the EMWEB_STRING tag 301 first defines using "C=" a boundary character 303 used to define the end 305 of the included source code. Immediately following the boundary character definition is a fragment of C code 307 which returns a pointer to a string representing one of three fax states. When served by an embedded application, this example HTML produces the text "NetFax State:" followed by "Sending", "Receiving" or "Idle", depending on the value of the symbol GlobalFaxState.

The example of FIG. 4 shows the use of EMWEB_STRING to output typed data whose type is defined by an attribute, EMWEB_TYPE 401. The EmWeb™/compiler uses this attribute 401 to produce a source code output routine which converts the typed data found at the address returned 403 into a string for serving at the proper location in the document.

A similar function is performed by the HTML extension, the EMWEB_INCLUDE tag. Using this tag, standard parts of a GUI such as headers and footers common to multiple pages or windows of information need only be stored once. Header and footer files are referred to using the EMWEB_INCLUDE tag which inserts them at the location in each HTML content document where the tag is placed. In the described embodiment of the invention, the contents of the EMWEB_INCLUDE tag must resolve to a relative or absolute path name within the local directory tree of content. This can be done by specifying a local Universal Resource Locator (URL), which is how resources are located in the World-Wide-Web communications paradigm, or by including source code which returns a string representing such a local URL. An absolute local URL takes the form "/path/filename", where "/path" is the full path from the root of the directory tree to the directory in which the file is located. A relative URL defines the location of a file relative to the directory in which the current, i.e., base, document is located and takes the form "path/filename". While the described embodiment requires resolution of the EMWEB_INCLUDE tag to a local URL, the invention is not so limited. In alternate embodiments, local and external URLs may be permitted or other limitations imposed. Examples of the use of the EMWEB_INCLUDE tag are shown in FIGS. 5 and 6.

Figure 5:
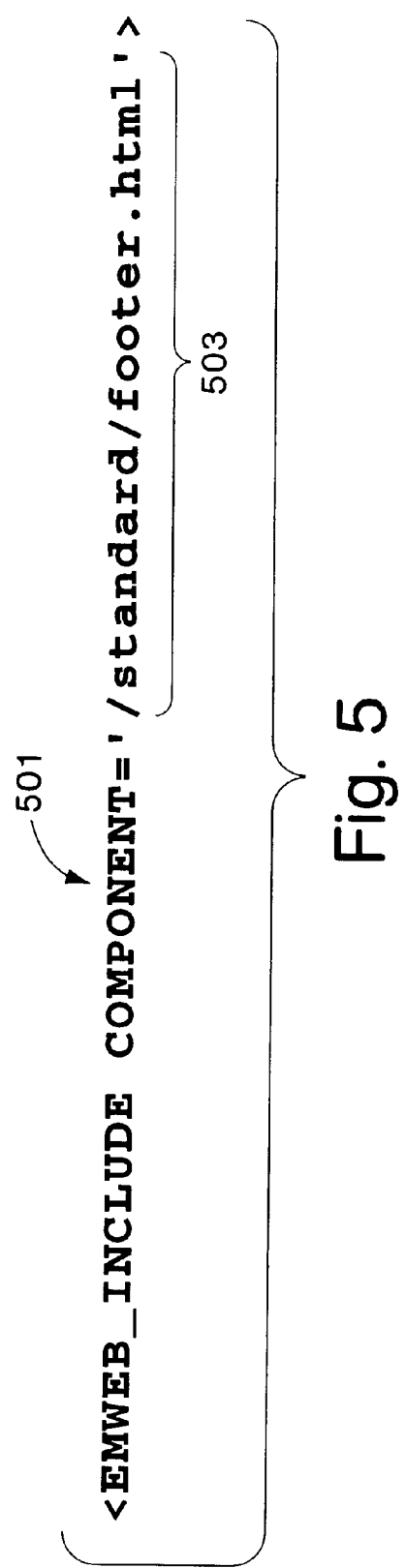
FIG. 5 is an HTML text fragment illustrating the use of an EMWEB_INCLUDE tag.

In the example of FIG. 5, a COMPONENT attribute 501 in an EMWEB_INCLUDE tag simply defines a local URL 503.

In the more elaborate example of FIG. 6, a fragment of source code 601 which produces a local URL 603 upon a defined condition 605 is used to generate a local URL at run time.

The results to be returned by an EMWEB_STRING or EMWEB_INCLUDE tag can also be built up iteratively using repeated calls to the included source code. This is done using the EMWEB_ITERATE attribute, yet another extension to HTML. Examples of the use of EMWEB_ITERATE are shown in FIGS. 7 and 8.

FIG. 7 shows an example of the EMWEB_ITERATE attribute 701 used in connection with the EMWEB_STRING tag 703. The fragment of code 705 is executed repeatedly until a NULL is returned. Thus, this HTML repeatedly executes the C source code fragment to display the tray status of all trays in a system.

Similarly, in FIG. 8, EMWEB_INCLUDE 801 and EMWEB_ITERATE 803 are used to build a table of features for which content from other URLs 805 are to be displayed. When the table is complete, a NULL is returned 807, terminating the iterations.

Since the extensions to HTML described above allow the encapsulation of source code within an HTML document a mechanism with which to provide the encapsulated source code with required global definitions, header files, external declarations, etc. is also provided in the form of an EMWEB_HEAD tag. The EMWEB_HEAD tag specifies a source code component to be inserted in the source code output of the EmWeb™/compiler, outside of any defined function. Although it is preferred that the EMWEB_HEAD tag appears in the HTML file header, it may appear anywhere. The code generated by an EMWEB_HEAD tag is placed before any functions or other code defined within the HTML content source documents.

As indicated above, the GUI may be prototyped using a conventional server and browser (see FIG. 14) to preview the HTML documents comprising the GUI. Therefore, it may be useful to provide static content with which to preview the page, at locations where dynamic content will appear during use, but which does not appear in the compiled document. For example, it may be useful to include a prototyping value for content which is otherwise provided using the EMWEB_STRING tag mechanism. Therefore, another extension to HTML recognized by the EmWeb™/compiler is the EMWEB_PROTO begin 309 and end 311 tags, as shown in FIG. 3. The EmWeb™/compiler removes these tags and everything between them when compiling the document, but the tags are ignored and the text between them is interpreted normally by a conventional browser viewing the HTML document either directly or via a conventional server. Conventional browsers recognize the tag due to its special syntax, e.g., being enclosed in "<" and ">", but are designed to ignore and not display any tag for which the browser does not have a definition. All EmWeb™/compiler HTML extensions are thus skipped over by conventional browsers. Thus, in the example of FIG. 3, the prototype page displays "NetFax State: Sending". FIG. 4 shows a similar use of EMWEB_PROTO tags.

Figure 9:
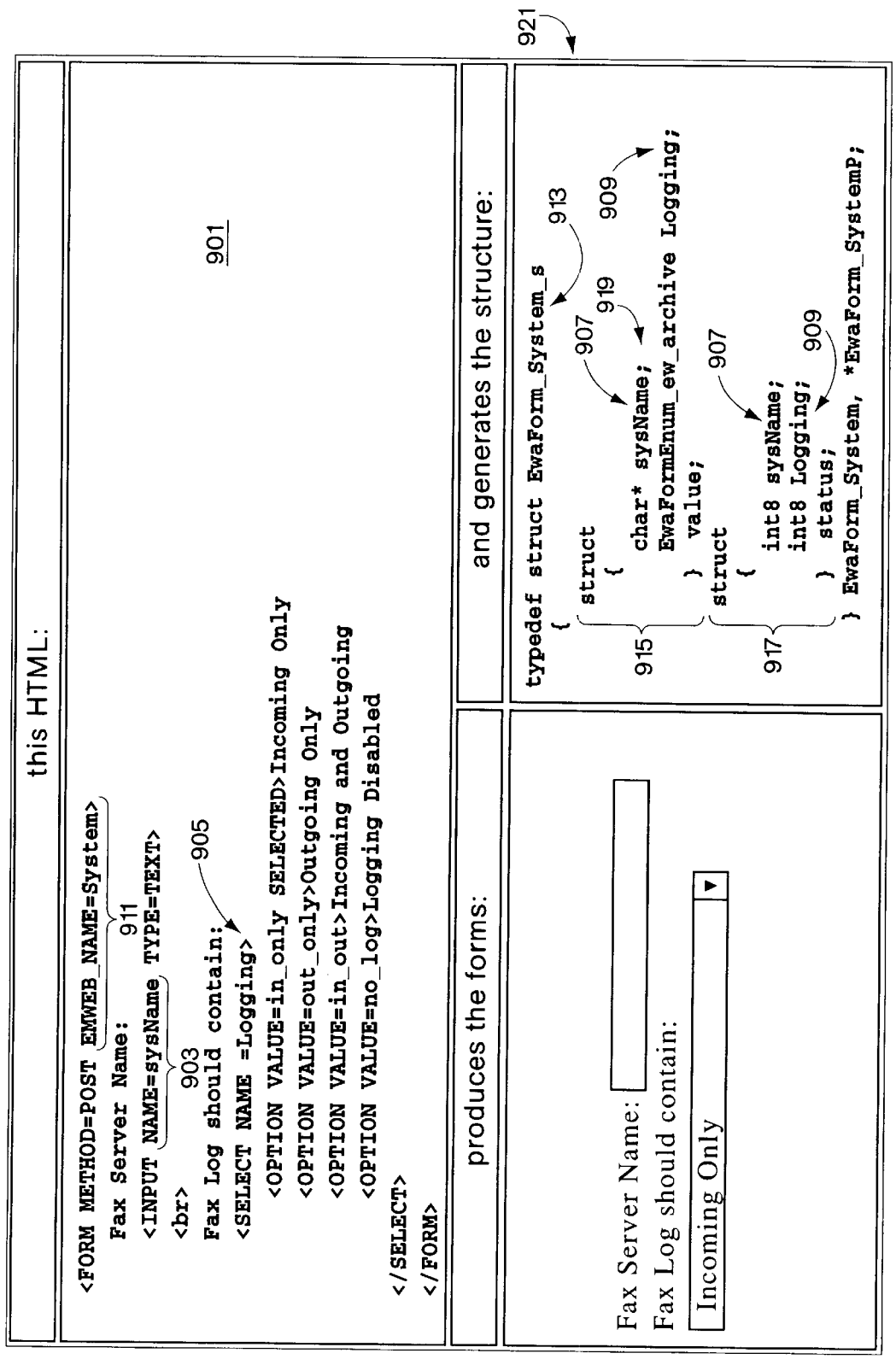
FIG. 9 is an example of forms processing showing the relationship between the HTML source code for the form and the form output produced.

Handling of HTML forms by the EmWeb™/compiler is now described in connection with FIG. 9. As seen in FIG. 9, an HTML form is defined substantially conventionally. Names used in the form are used in constructing symbol names used in the output source code produced by the EmWeb™/compiler. Therefore names should be valid symbol names in the source code language.

Each element of a form definition is translated by the EmWeb™/compiler into a part of a corresponding data structure defined for that form. Forms data is moved into and out of the application by changing values of items in the data structure.

Turning now to the example in FIG. 9, the relationship between the illustrated HTML form definition and the corresponding data structure is described. The form is given a unique name, using an EMWEB_NAME attribute in a FORM tag. The form name becomes part of the structure name, for easy reference and uniqueness. The form name will also be used to generate function names for functions which are called when the form is served and when the form is submitted.

The structure generated is itself composed of two structures. The first holds values of each dynamic element of the form. The second holds a status flag indicating the status of the contents of a corresponding value. Thus, in the example of FIG. 9, a structure to hold values and status for the sysName INPUT and the Logging SELECTion is created. The value of sysName is a character string, while Logging is an enumerated type.

Two function prototypes are also generated. The actions to be performed by these functions must be defined by the developer. The Serve function is called when the form is served and can be used to supply default values, for example. The Submit function is called when the form is submitted, to update values in the data structure, for example.

Currently, EmWeb™/compiler supports TEXT, PASSWORD, CHECKBOX, RADIO, IMAGE, HIDDEN, SUBMIT, RESET, SELECT and OPTION input fields. For detailed descriptions, see Appendix A, Section 3.2.5. In addition, the EmWeb™/compiler supports "typing" of TEXT input field data. That is, the EMWEB_TYPE attribute may be used to define a TEXT input field to contain various kinds of integers, a dotted IP address (i.e., an address of the form 000.000.000.000), various other address formats, etc. A mapping of EMWEB_TYPE values to C language types is formed in the table in Appendix A, Section 3.2.5.3.

The EmWeb™/compiler has been described in terms of a generic application source code language. The current commercial embodiment of the EmWeb™/compiler assumes the application source code language to be C or a superset thereof, e.g., C++. However, the functionality described can be generalized to any application source code language which may be preferred for a particular application purpose. However, in order to more fully understand how the EmWeb™/compiler and HTML extensions described above cooperate to permit integration of an HTML defined GUI with an application defined in an application source code, it will be assumed, without loss of generality, that the application source code language is C or a superset thereof.

The EmWeb™/compiler produces a set of output files including a data.dat file containing the fixed data of a content archive, a code.c file containing the generated source code portions of an archive including portions defined in EMWEB_STRING, EMWEB_INCLUDE and EMWEB_HEAD tags and other source code generated by the EmWeb™/compiler, as well as proto.h and stubs.c files containing the definitions of C functions used for forms processing. The structure of these files is now described in connection with the data structure illustrated in FIG. 10.

Figure 10:
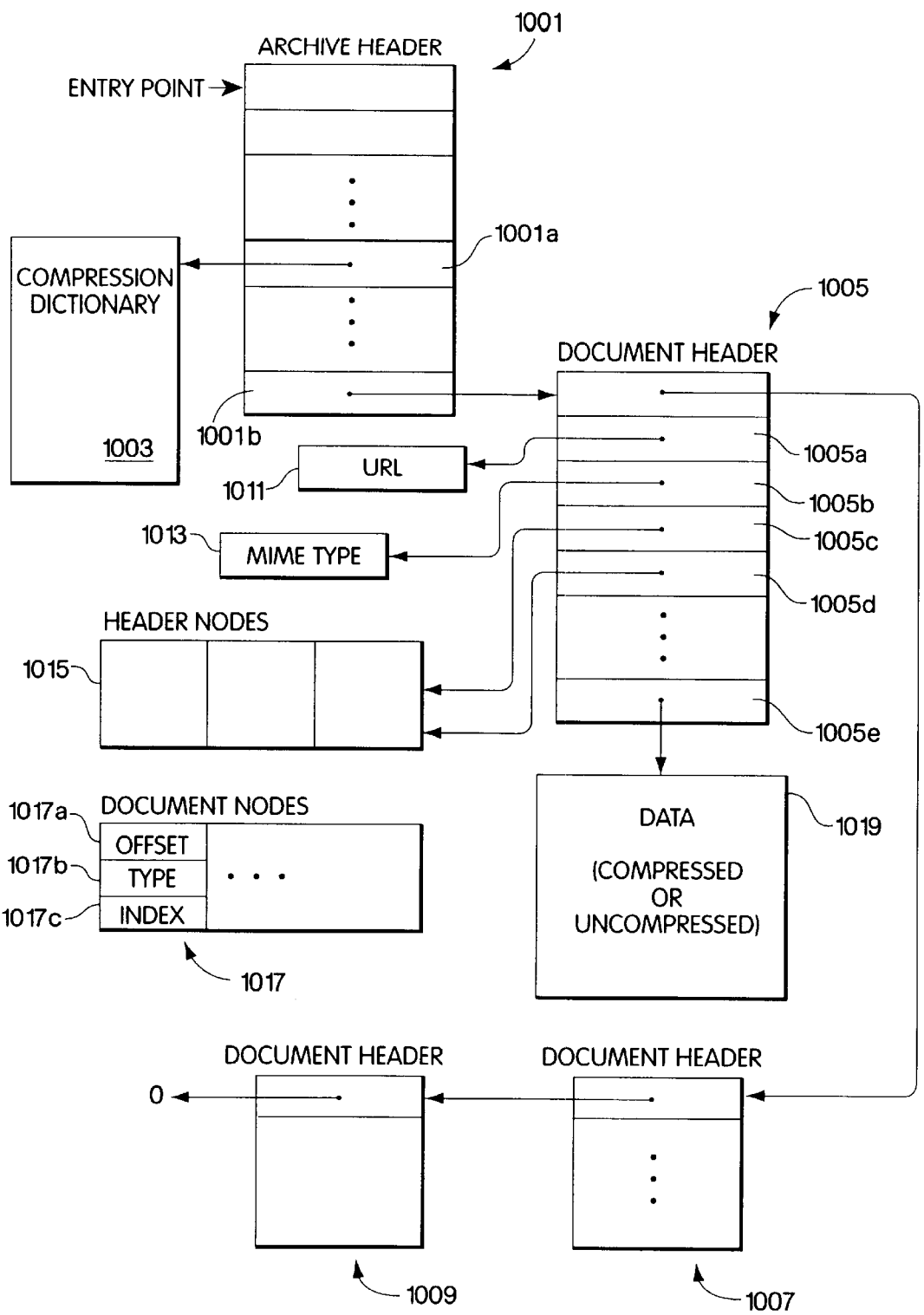
FIG. 10 is a block diagram of the data structure which defines the header for the data.dat archive file.

The content archive file data.dat has a header structure as illustrated in FIG. 10. The data structure is accessed through an archive header 1001 which is a table of offsets or pointers to other parts of the archive. For example, there is a pointer 1001a to a compression dictionary 1003 for archives which include compressed documents. There is also a pointer 1001b to a linked list of document headers 1005, 1007 and 1009. Each document header 1005, 1007 and 1009 is a table of offsets or pointers to various components of the document. For example, the document header includes a pointer 1005*a* to the URL 1011 to which the document corresponds. There is also a pointer 1005*b* to a field 1013 giving the Multipurpose Internet Mail Extension (MIME) type of the document. There are pointers 1005*c* and 1005*d* respectively to header nodes 1015 and document nodes 1017, explained further below. Finally, there is a pointer 1005*e* to a block of static compressed or uncompressed data 1019 representing the static portions of the document.

The static data does not include any EmWeb™ tags, i.e., the extensions to HTML discussed above and defined in detail in Appendix A. Rather, information concerning any EmWeb™ tags used in the document appears in the document nodes structure.

Each EmWeb™ tag employed in a document is represented in that document's document nodes structure as follows. The location of the EmWeb™ tag within an uncompressed data block or an uncompressed copy of a compressed data block is represented by an offset 1017*a* relative to the uncompressed data. The type of tag is indicated by a type flag 1017*b*. A node may include a flag which indicates any attributes associated with the tag represented. For example, a node for a tag of type EMWEB_STRING may include a flag indicating the attribute EMWEB_ITERATE. Finally, nodes include an index 1017*c*. In nodes defining form elements, the index holds a form number and element number uniquely identifying the element and form within the document. In nodes defining EMWEB_STRING tags, the index is a reference to the instance of source code which should be executed at that point. As such, the index may be evaluated in an expression of a "switch" statement in C, where each controlled statement of the "switch" statement is one source code fragment from one EMWEB_STRING instance. Alternatively, the index may be a pointer or index into a table of source code fragments from EMWEB_STRING tags, which have been encapsulated as private functions.

The data structure defined above provides a convenient way of transferring control as a document containing dynamic content is served. When a document is requested, the list of document nodes is obtained, to determine at what points control must be transferred to code segments which had been defined in the HTML source document. The document is then served using the data block defining the static elements of the document, until each document node is encountered. When each document node is encountered, control is transferred to the appropriate code segment. After the code segment completes execution, the static content which follows is served until the offset of the next document node is encountered.

Header nodes permit the storage of document meta information, not otherwise handled, such as content language, e.g., English, German, etc., cookie control, cache control or an e-tag giving a unique version number for a document, for example a 30-bit CRC value computed for the document. By avoiding having to put this information in the header of each document, significant space can be saved in the archive because not all documents require this information. Therefore, header nodes need only be stored for documents using this information.

The data structure which represents the archive of content used by the EmWeb™/compiler embodiment of the invention is defined by the C source code contained in Appendix B.

Run-time Environment

Aspects of the invention related to the run-time environment and server are embodied in the EmWeb™/server as described in detail in Appendix A, Section 4.

Figure 2:
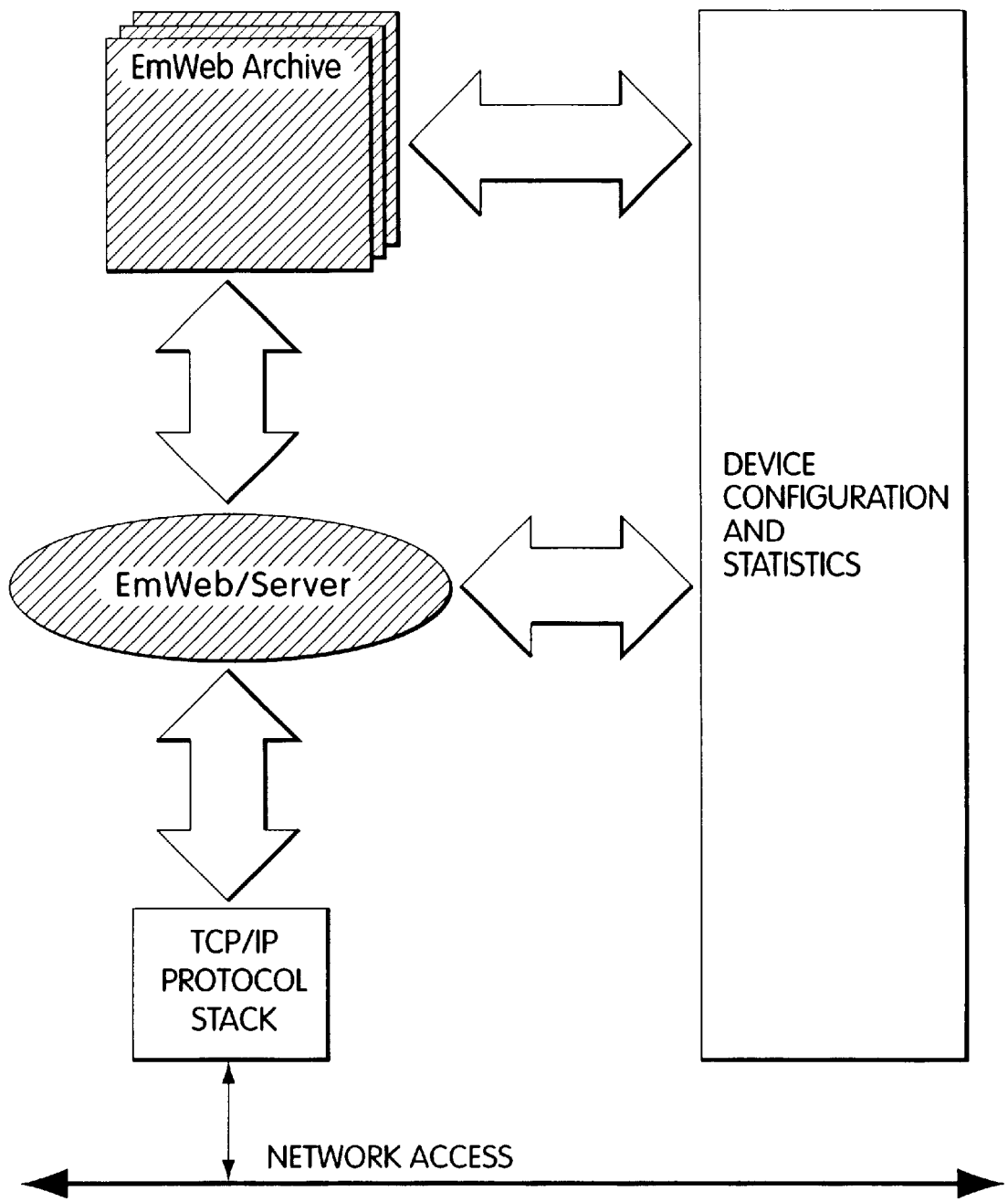
FIG. 2 is a block diagram of that aspect of the invention relating to an embedded system.

To a conventional browser implementing HTTP, the EmWeb™/server behaves conventionally. However, as shown in FIG. 2, the EmWeb™/server is fully integrated with the application and therefore has access to information about the application and device in which it is embedded.

Operation of the EmWeb™/server with respect to presentation of dynamic content is now described in connection with FIG. 11.

Figure 11:
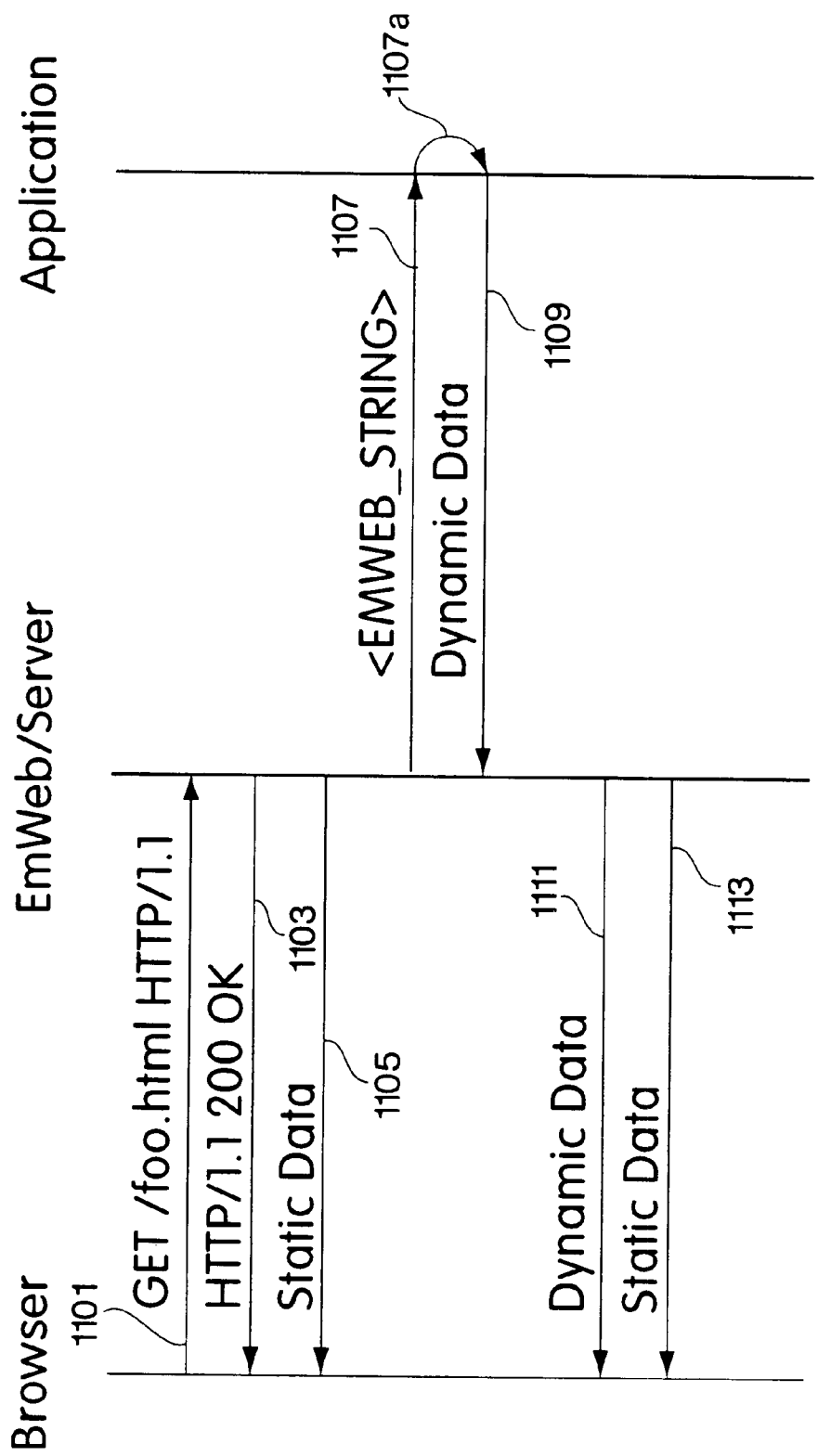
FIG. 11 is a state diagram of an embedded system illustrating dynamic content processing.

Before the operations shown in FIG. 11 commence, one or more archives are loaded by the server. When each archive is loaded, the server generates a hash table using the archive header data structure to make documents easy to locate using URLs.

First, the browser requests a document at a specified URL, using HTTP 1101. The EmWeb™/server acknowledges the request, in the conventional manner 1103. The EmWeb™/server then uses the hash table of the archive header to locate the document requested and begin serving static data from the document 1105. When a document node is encountered, for example denoting the presence of an EMWEB_STRING tag, then the server passes control to the code fragment 1107*a* of the application which had been included in the EMWEB_STRING tag 1107. When the code fragment completes execution and returns some dynamic data 1109, the EmWeb™/server then serves that dynamic data to the browser 1111. The EmWeb™/server then resumes serving any static data remaining in the document 1113. This process continues until the entire document, including all dynamic elements has been served.

Figure 12:
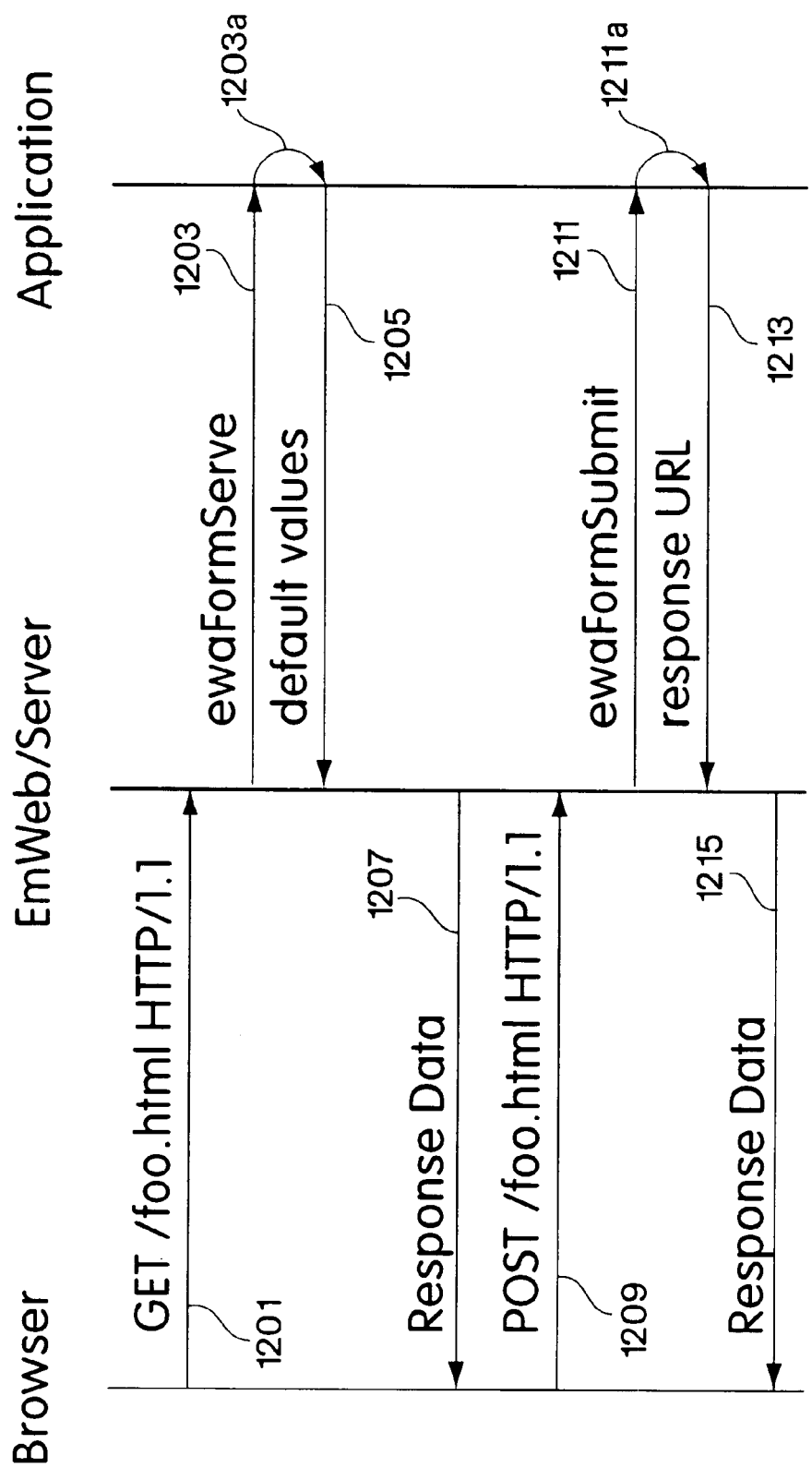
FIG. 12 is a state diagram of an embedded system illustrating forms processing.

Run-time serving and submission of forms is now described in connection with FIG. 12. A brief inspection of FIG. 12 will show that form service and submission proceeds along similar lines to those for serving dynamic content.

The browser first requests a URL using HTTP 1201. When, during service of the contents of the URL requested, a form is encountered, service of the form and any HTML-defined default values commences normally. The EmWeb™/server then makes a call to the application code 1203 to run a function 1203*a* which may substitute alternate default values 1205 with which to fill in the form. The document served then is made to include the default values defined by the static HTML as modified by the application software 1207. Later, when the user submits the form, the browser performs a POST to the URL using HTTP 1209. The form data is returned to the application by a call 1211 made by the EmWeb™/server to a function 1211 which inserts the data returned in the form into the data structure defined therefor within the application code. The response 1213 is then served back to the browser 1215.

Finally, it should be noted that there may be times when a request for dynamic content may require extended processing, unacceptably holding up or slowing down other operations performed by the application. In order to avoid such problems, the EmWeb™/server implements a suspend/resume protocol, as follows. The suspend/resume protocol exists within a context of a scheduler maintained and operated by the server. The scheduler includes a task list of scheduled server tasks to be performed.

Figure 13:
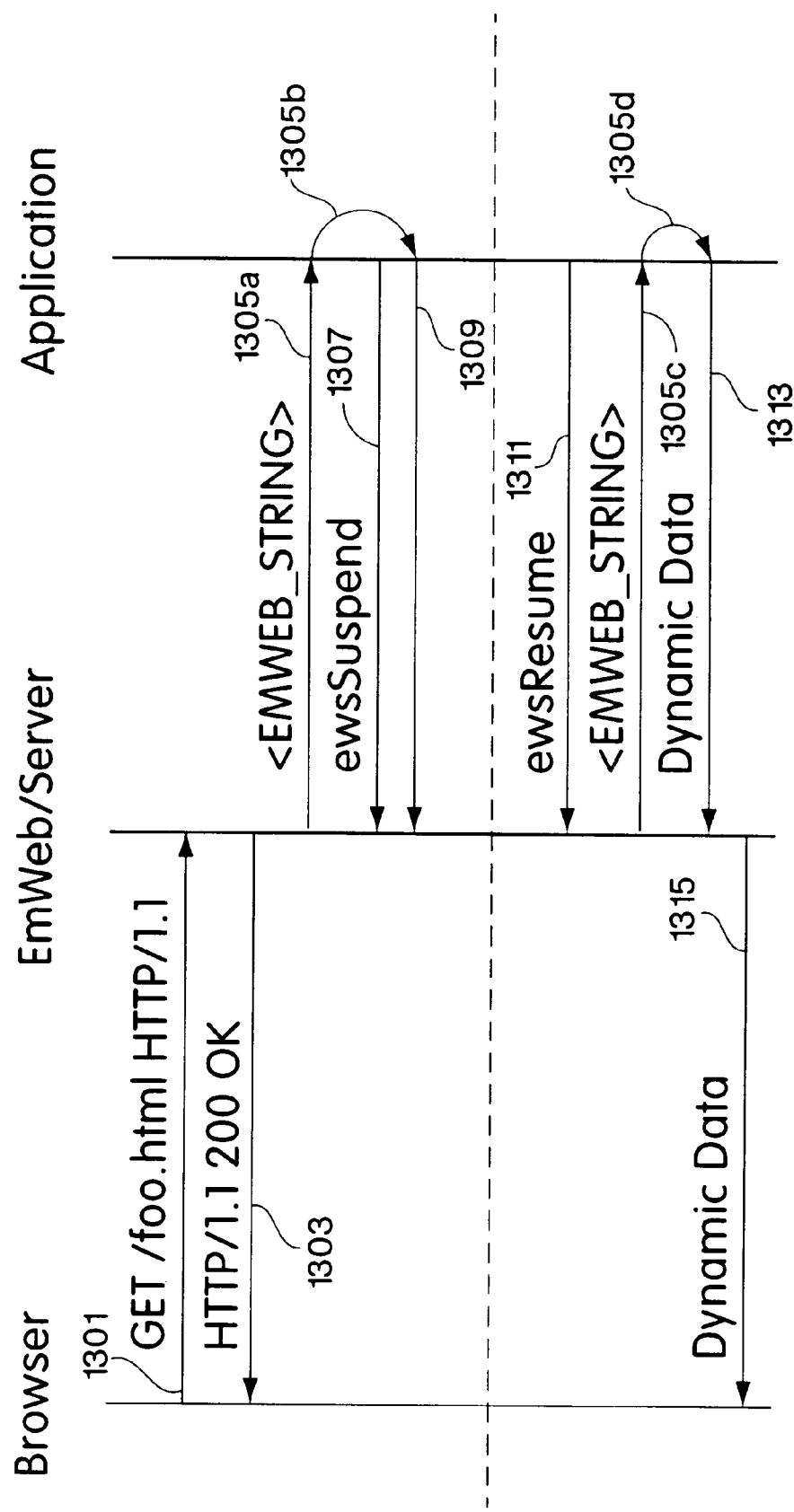
FIG. 13 is a state diagram of an embedded system illustrating suspend/resume processing.

FIG. 13 illustrates a situation where a browser requests a document containing an EMWEB_STRING tag whose processing is expected to interfere with other application operations. The initial HTTP request 1301 for the document is acknowledged 1303, conventionally. When the EMWEB_STRING tag is encountered, control transfers 1305*a* to the appropriate source code fragment 1305*b* in the application. The application then calls the suspend function 1307 of the EmWeb™/server and returns a dummy value 1309 to the function call generated at the EMWEB_STRING tag location. Calling the suspend function 1307 causes the scheduler to remove the EMWEB_STRING processing task from the task list. When the application has finally prepared the dynamic content required in the original function call, the application calls a resume function 1311 of the EmWeb™/server. Calling the resume function 1311 requeues the EMWEB_STRING processing task on the task list, as the current task. The EmWeb™/server responds by calling 1305c the function 1305d defined at the EMWEB_STRING tag again, this time immediately receiving a response from the application in which the requested dynamic content 1313 is returned. The dynamic content is then served to the browser 1315.

The suspend/resume feature is particularly useful in distributed processing environments. If an embedded application is running on one processor of a distributed environment, but dynamic content can be requested which is obtained only from another processor or device in the distributed environment, then the use of suspend/resume can avoid lockups or degraded processing due to the need to obtain the dynamic content through a communication path of the distributed environment. Consider, for example, a distributed system including a control or management processor, and several communication devices. An embedded application running on the management processor can be queried for configuration data of any of the communication devices. Without suspend/resume, obtaining that data would tie up the communication path used by the management processor for control of the various communication devices, degrading performance.

As described above, a compiled archive may include one or more dynamic elements. It may be desired to permit some portions of the user interface defined by such a compiled archive to be changed or replaced, without disturbing other portions of the user interface. For example, in designing a user interface, a programmer may need to rewrite the definition of the interface, which is written in mark-up language, e.g., HTML, while making use of established dynamic elements, for example written in c. The process desired resembles the paradigm in other programming disciplines in which a program is written which make calls to substantially unchanging library functions.

Figure 16:
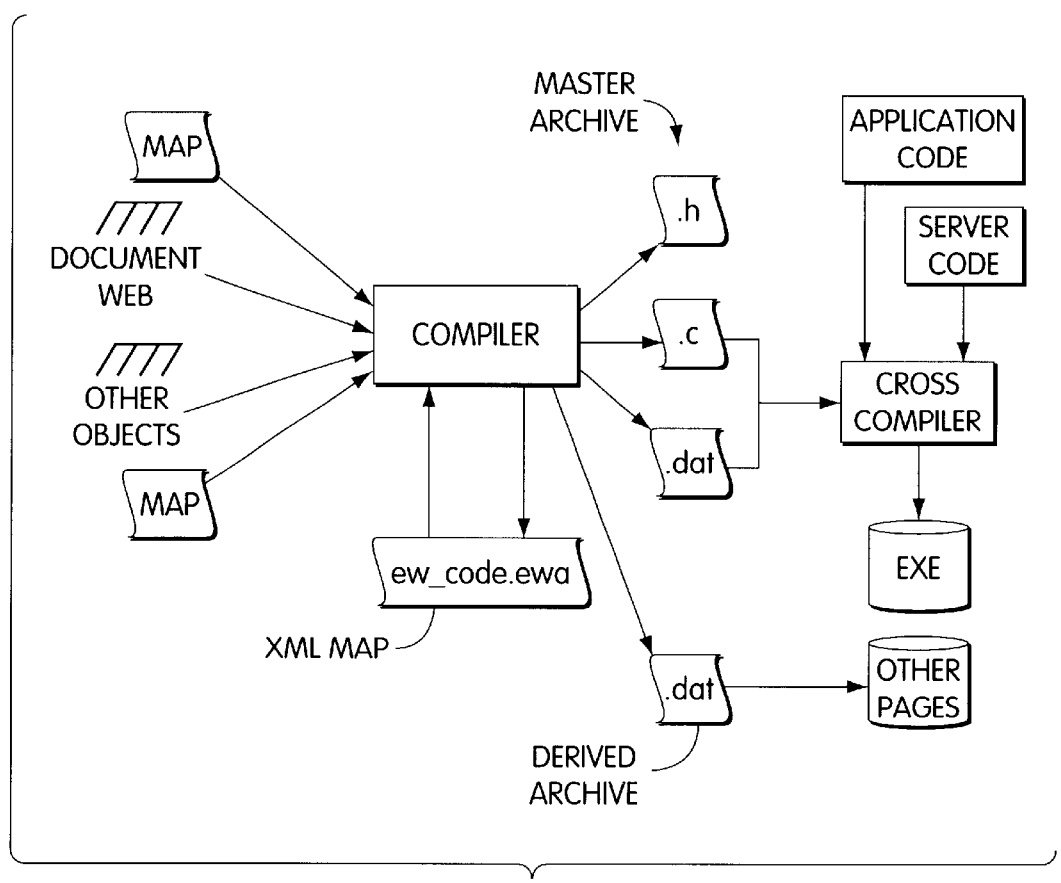
FIG. 16 is a block diagram illustrating another aspect of the invention related to a development system.

The archive compiler recognizes names for EMWEB_STRING and EMWEB_FORMS constructs, as well as a general object namespace, whereby objects can be referred to by name, both internally and externally to a given source file. In order to support named references to an object, the compiler generates and exports a symbol table, ew_code.ewa, mapping the .c and .dat files discussed above. The .ewa file is then reimported into the compiler to generate derived archives, as shown in FIG. 16. This process is now described in greater detail.

Source files defining a user interface as a web site and other HTML files referencing named structures are supplied to the compiler, together with maps of external structures, such as a Namespace map. The compiler produces a master archive including header (.h), code (.c) and data (.dat) files. Also produced is the ew_code.ewa map. The ew_code.ewa map is fed back to the compiler. Modified web pages can then be compiled with the map files to produce derived archives referring to named objects in the master archives. The pages of the derived archives can therefore be substituted for master archive pages, while making use of the dynamic elements already coded. Only the master archive needs be cross-compiled and linked with the application and server for which the user interface is the front end, to produce executable code.

The described embodiments of the invention illustrate several advantages thereof. For example, an embedded application can now have a GUI which is independent of either the application platform of that used to view the GUI. For example, the GUI can be operated through a Microsoft® Windows™ CE machine, Windows™ 3.x machine, Apple Macintosh, WebTV box, etc. running conventional browser software. Also, development of a GUI for an embedded application is greatly simplified. The look and feel is designed using conventional HTML design techniques, including straightforward prototyping of the look and feel using a conventional client server system, using simple HTML extensions. Integration with the embedded application does not require the developer to learn or develop any special interface, but rather uses some HTML extensions to incorporate application source code directly into the HTML content. Yet another advantage in that the entire embedded application along with an HTTP-compatible server and the content to be served is reduced to a minimum of application source code, data structures for static data and data structures for dynamic data.

The present invention has now been described in connection with specific embodiments thereof. However, numerous modifications which are contemplated as falling within the scope of the present invention should now be apparent to those skilled in the art. For example, the invention is not limited to content whose source is HTML. Any mark up language could be used in the context of this invention. Alternatively, the content source could be raw text, which is particularly suitable for situations where the output of the user interface is also processed by one or more automatic software text filters. Therefore, it is intended that the scope of the present invention be limited only by the properly construed scope of the claims appended hereto.

What is claimed is:

1. A method of providing from a server to a client a graphical user interface having dynamic elements, comprising:

defining elements of the graphical user interface in at least one text document written in a mark-up language and stored with the server;

including at a location in the document a code tag containing a segment of application source code written in a language other than the mark-up language;

serving the text document from the server to the client which interprets the mark-up language but does not interpret the application source code; and when the location is encountered, serving from the server to the client a sequence of characters derived from a result of, before the step of serving, executing a sequence of instructions represented by the segment of application source code.

2. The method of claim 1, further comprising:

including in the document at least one more code tag containing a segment of application source code.

3. The method of claim 1, wherein the step of defining further comprises:

providing a plurality of documents which collectively define the graphical user interface; and storing the text document and the plurality of documents as files in a directory tree.

4. The method of claim 3, further comprising:

compiling the directory tree and the files therein into an archive including content sources; and decompiling a content source back into the text document before the step of serving.

5. A method for developing and prototyping an application software program having a graphic user interface defined by information served from a server program to a client program, the method comprising the steps of:

accessing a file contain the information served, including HTML tags, encapsulating source code written in a language other than HTML within tags in portions of said file, the source code not served to the client program, producing a source code module from said file with encapsulated source code producing source code for a server, and cross compiling and linking said application, said source code module and said server source code thereby producing executable object code which serves the information defining the graphic user interface, and information which varies as a result of executing the object code.

6. The method of claim 5, further comprising the steps of:

running said object code, executing said compiled encapsulated source code when requested by a viewer, wherein said encapsulated source code is associated with said application.

7. The method of claim 6, further comprising the steps of:

converting data returned by execution of said compiled encapsulated code into a form displayable by said viewer.

8. The method of claim 7, wherein the data returned by executing said compiled encapsulated code changes over time as a result of changes within the application.

9. A data structure fixed in a computer readable medium, the data structure for use in a computer system including a client and a server in communication with each other, the data structure comprising:

cross-compiled, stored and linked, including therein encapsulated portions containing executable code, written in a language other than HTML, and associated with said application, server code, and application code, wherein said executable code runs and generates data for the server to serve to the client when the HTML file is served thereby providing real time dynamic data associated with said application.

10. A computer software product including a computer-readable medium encoded with a sequence of instructions defining a method comprising:

defining elements of the graphical user interface in at least one text document written in a mark-up language and stored with the server;

including at a location in the document a code tag containing a segment of application source code written in a language other than the mark-up language;

serving the text document from the server to the client which interprets the mark-up language but does not interpret the application source code; and when the location is encountered, serving from the server to the client a sequence of characters derived from a result of, before the step of serving, executing a sequence of instructions represented by the segment of application source code.

11. The software produce of claim 10, the method defined by the sequence of instructions further comprising:

including in the document at least one more code tag containing a segment of application source code.

12. The method of claim 10, wherein the step of defining further comprises:

providing a plurality of documents which collectively define the graphical user interface; and storing the text document and the plurality of documents as files in a directory tree.

13. The method of claim 12, further comprising:

compiling the directory tree and the files therein into an archive including content sources; and decompiling a content source back into the text document before the step of serving.

* * * * *

UNITED STATES PATENT AND TRADEMARK OFFICE
CERTIFICATE OF CORRECTION

PATENT NO. : 6,456,308 B1
DATED : September 24, 2002
INVENTOR(S) : Ian D. Agranat, Kenneth A. Giusti and Scott D. Lawrence It is certified that error appears in the above-identified patent and that said Letters Patent is hereby corrected as shown below:

Column 2,
Line 50, please replace "ran-time" with -- run-time --.

Column 9,
Line 21, please replace "markup" with -- mark-up --.
Line 41, please replace "crosscompiled" with -- cross-compiled --.

Signed and Sealed this

Eleventh Day of February, 2003

JAMES E. ROGAN
*Director of the United States Patent and Trademark Office*